United States Patent [19]

Aranovich et al.

[11] Patent Number: 6,111,389
[45] Date of Patent: Aug. 29, 2000

[54] RAPIDLY CHARGING A BATTERY WITHOUT OVERCHARGING

[75] Inventors: Gene Aranovich, Middletown, N.Y.; David C. Nall, Lincroft, N.J.; Claudio Spinelli, Staten Island, N.Y.; Edwin A. Muth, Aberdeen, N.J.

[73] Assignee: Lucent Technologies Inc., Murray Hill, N.J.

[21] Appl. No.: 09/099,253

[22] Filed: Jun. 18, 1998

[51] Int. Cl.$^7$ .......................... H01M 10/44; H01M 10/46
[52] U.S. Cl. .............................. 320/150; 320/160
[58] Field of Search ...................... 320/125, 144, 320/150, 152, 153, 155, 157, 162, 163, 160

[56] References Cited

U.S. PATENT DOCUMENTS

| | | | |
|---|---|---|---|
| 3,959,707 | 5/1976 | Stephens | 320/153 X |
| 4,065,712 | 12/1977 | Godard et al. | 320/DIG. 11 X |
| 4,659,977 | 4/1987 | Kissel et al. . | |
| 5,204,611 | 4/1993 | Nor et al. . | |
| 5,332,958 | 7/1994 | Sloan . | |
| 5,477,125 | 12/1995 | Ettel et al. . | |
| 5,572,110 | 11/1996 | Dunstan . | |
| 5,604,419 | 2/1997 | Bisschop et al. . | |
| 5,825,159 | 10/1998 | Patino | 320/150 X |

FOREIGN PATENT DOCUMENTS

0760532A1  12/1995  European Pat. Off. .

*Primary Examiner*—Edward H. Tso

[57] ABSTRACT

In the rapid charging of a Nickel Cadmium (NiCad) battery, the rapid charging is terminated and trickle charging is initiated when any of three conditions is satisfied: a first condition determined by comparing a sensed instantaneous battery voltage with a target voltage; a second condition which is determined by comparing the instantaneous battery temperature with minimum and maximum values; and a third condition determined by comparing an elapsed time of rapid charging with a maximum value. Because battery voltage versus rapid charging time is a function of ambient temperature, the target voltage is determined from an initial measurement of battery temperature, which is assumed to equal the ambient temperature. The target voltage, which is approximately a linearly declining function of ambient temperature, is determined by reading a stored lookup table using the sensed temperature as an index or address.

18 Claims, 3 Drawing Sheets

RAPIDLY CHARGING A BATTERY WITHOUT OVERCHARGING

BACKGROUND OF THE INVENTION

1. Field of the Invention

The present invention relates to systems and methods for rapid charging of a rechargeable battery in a manner that the rapid charging is automatically terminated in response to a monitored battery parameter reaching or passing a target or limit value in order to mitigate overcharging.

2. Description of the Related Art

Portable devices of various types are powered by one or more rechargeable batteries which require rapid recharging to a substantially fully charged state in order that the device is readily available for use. Examples of such battery powered devices are cordless and cellular phone handsets, shavers, and computers. In order to trigger automatic termination of rapid recharging of the battery when a substantially fully charged state is reached, it is known that the battery charger control include means for monitoring the rate of increase over time or increase between successive samples of the battery temperature and for determining when the rate of increase first equals or exceeds a predetermined target or threshold rate. Unfortunately, the inventors herein have determined with respect to a Nickel Cadmium (NiCad) battery in particular, that the battery temperature will not exhibit a significant and reliably detectable rate or amount of increase until it is too late to terminate the rapid charging without causing permanent damage due to overcharging after multiple discharge/recharge cycles.

It is also possible to monitor the rate of change or change between samples of the battery voltage and to instead determine when the rate of change equals or falls below a predetermined target or threshold rate. However, as in the case of detection of the rate of change of battery temperature, battery damage will occur due to overcharging after multiple rechargings if each rapid charging is not terminated until the time the rate of change battery voltage falls below a predetermined reliably detectable threshold value.

OBJECTS AND SUMMARY OF THE INVENTION

It is a general object of the present invention to provide a battery charging system and method including the reliable detection of when a battery undergoing rapid charging has reached a substantially fully charged state before any significant battery damage occurs due to overcharging, so that the rapid charging can be automatically terminated.

In accordance with the present invention a first condition indicative of a desired substantially fully charged state occurring before battery damage due to overcharging is determined from the instantaneous value of a sensed battery voltage, rather than its rate of increase, and also from a sensed battery temperature or a sensed ambient temperature. In particular, a target battery voltage is determined from the sensed temperature, and the instantaneous battery voltage is repeatedly compared with the target voltage. When the sensed battery voltage equals the target voltage (or alternatively, first exceeds the target voltage) the first condition is satisfied. Rapid charging is then terminated and a trickle charging mode is commenced.

The target voltage may be determined by reading a lookup table stored in a memory of the portable device, using the sensed temperature as an index or address.

For increased reliability in protecting the battery from overcharging, there are also utilized a second condition in which the instantaneous battery temperature is repeatedly compared with a predetermined maximum temperature, and a third condition in which the instantaneous elapsed time of rapid charging is repeatedly compared with a predetermined maximum time. The first, second, and third conditions are alternative conditions, since the rapid charging is terminated when either the instantaneous battery voltage equals the target battery voltage, the instantaneous battery temperature equals the maximum temperature, or the instantaneous elapsed time of charging equals the maximum time. Any or all of the aforementioned conditions may be replaced by an appropriate inequality. For example, the first condition can be considered satisfied when the target battery voltage first exceeds the target voltage or is first greater than or equal to the target voltage.

Other objects, features and advantages of the present invention will become apparent upon perusal of the following detailed description when taken in conjunction with the appended drawing, wherein:

DETAILED DESCRIPTION OF THE PREFERRED EMBODIMENTS

Figure 1A:
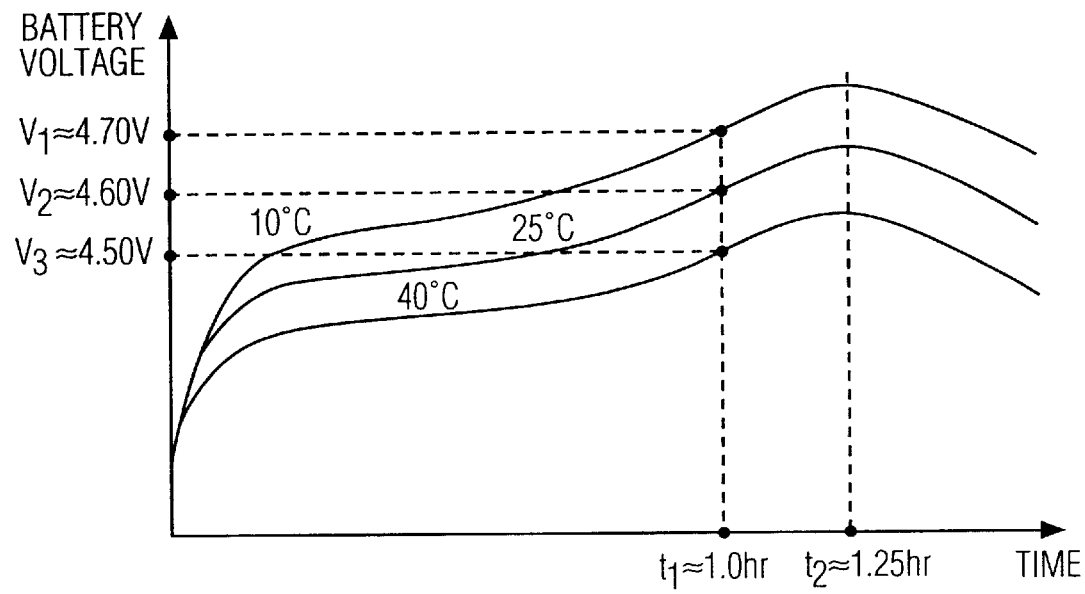
FIG. 1A shows three plots of battery voltage versus time during rapid charging at different ambient temperatures.
Figure 1B:
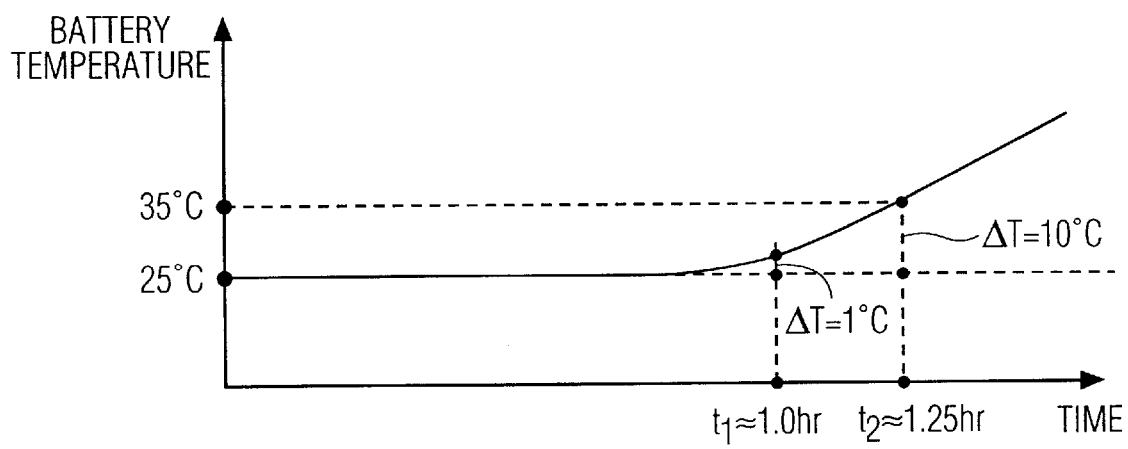
FIG. 1B is a plot of battery temperature versus time during rapid recharging at a particular ambient temperature, the time axis thereof being aligned with that of FIG. 1A.

The present invention is based upon the recognition that it is desirable to terminate rapid charging of a NiCad battery when the battery temperature just begins to rise, and that this time can be reliably determined from the instantaneous battery voltage, providing ambient temperature is taken into account. In particular, it has been found that the battery voltage versus time plot of a battery undergoing rapid charging with a constant charging current follows a path which depends significantly on ambient temperature. This is illustrated in FIG. 1A where different voltage vs. elapsed time plots are shown for ambient temperatures of 10° C., 25° C., and 40° C., respectively. Further, as shown in FIG. 1B for the illustrative particular ambient temperature of 25° C., the battery temperature initially equals the ambient temperature and remains at this temperature until a time $t_1$, when the temperature just begins to rise, at which time it is desirable to terminate the rapid charging and thereby avoid any damage to the battery. A time $t_2$ is also marked where the rate of increase of temperature is more pronounced and the battery voltage reaches a peak and begins to fall due to the temperature rise. Unfortunately battery damage begins to occur after multiple rechargings which each terminate after time $t_1$ and significant damage occurs after multiple rechargings when one waits until time $t_2$ to terminate each rapid recharging.

With respect to a cordless handset battery undergoing rapid charging at about 700 ma, times t1 and t2 occur at about 1.0 and 1.1 hours, respectively, of elapsed charging time. It is also noted from FIG. 1A that at time $t_1$ instantaneous battery voltages $V_1$, $V_2$ and $V_3$ for 10° C., 25° C., and 40° C. are approximately 4.70V, 4.60V, and 4.50V, respectively, for a three cell NiCad battery. It thus appears that in the range of 10° C. through 40° C. ambient temperature, the voltage at time $t_1$ is substantially a linearly declining function of ambient temperature, reducing by about 0.01V for a three cell NiCad battery for each increase in ambient temperature of 1.5° C. Consequently, a target battery voltage can be determined from a measurement of ambient temperature (initial battery temperature) and then detection of the instantaneous battery voltage reaching (or exceeding) this target voltage can be used as a condition for terminating the rapid charging of the battery.

Also, further conditions are advantageously placed upon the continuation or initiation of the rapid charging for failsafe purposes. These include that the instantaneous battery temperature T is greater than (or equal to) a minimum temperature $T_{min}$ (preferably 10° C.) and less than (or equal to) a maximum temperature $T_{max}$ (preferably 40° C.), and that the elapsed time of rapid charging is less than (or equal to) a maximum time $t_{max}$ (preferably 1 hour)

Figure 2:
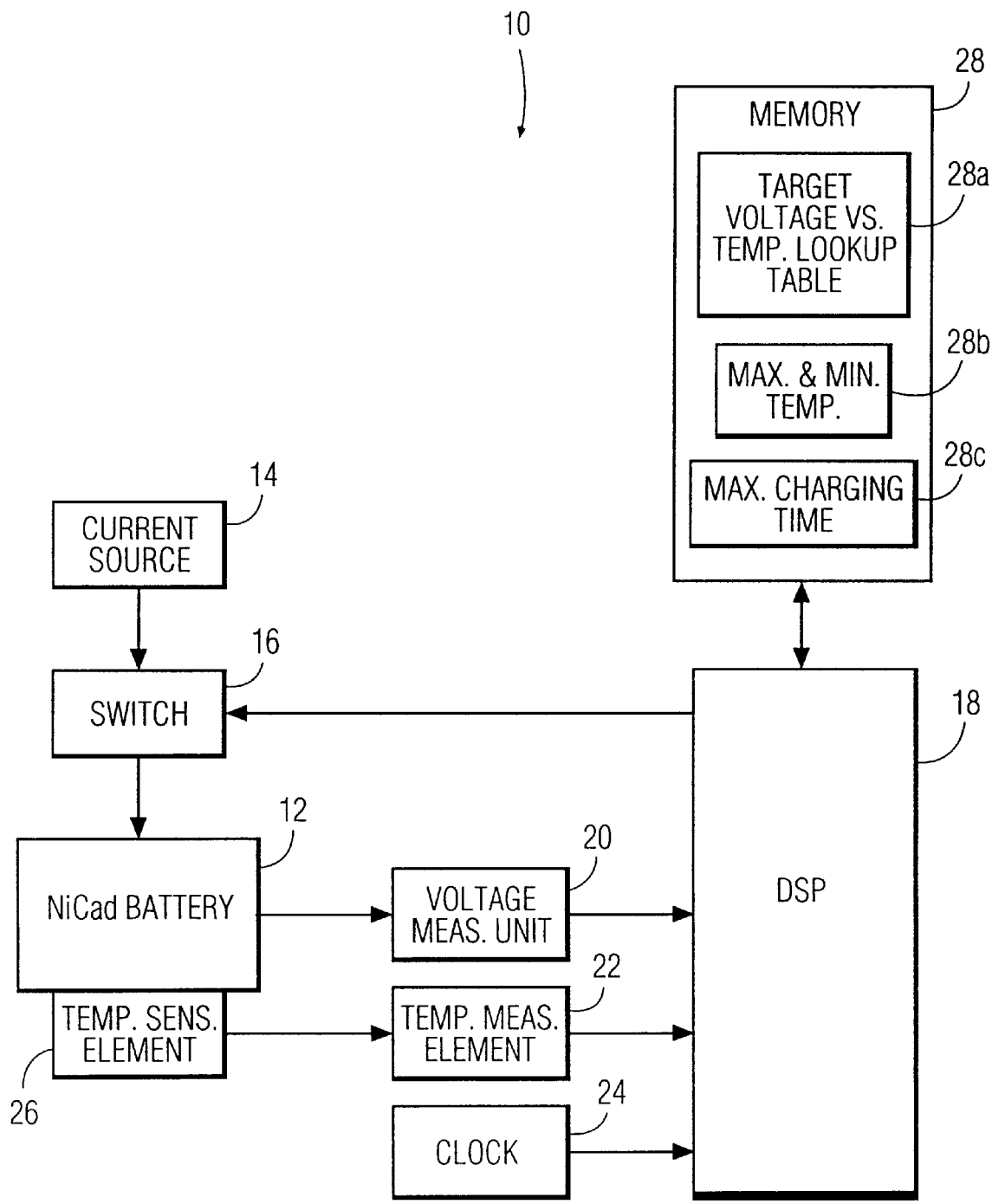
FIG. 2 is block diagram of a battery charging system in accordance with the present invention in conjunction with a battery to be charged.

From the foregoing discussion, the purposes of the various functional blocks in FIG. 2 should be readily understood. Therein, a charging system 10 in accordance with the present invention is shown schematically in conjunction with a NiCad battery 12 to be charged. The battery 12 may be a separate item which is electrically and physically engaged in a charger (not shown) containing the various other parts of charging system, or alternatively, battery 12 may be located within a portable device which it powers which portable device is received and electrically engaged in a charger or base unit (not shown) for charging purposes. In the latter case, the various other parts of the system 10 may be distributed between the portable device and the charger or base unit as a matter of design choice. Any known rechargeable battery powered portable devices may advantageously utilize the charging system of the present invention, including but not to cordless or cordless phones, shavers, and computers.

Charging system 10 includes a current source 14 which applies charging current to battery 12 via a switch 16. The switch 16 has a first state for applying a constant high current for rapid charging and a second state for applying a constant low current for trickle charging, which states are assumed in response to digital command signals from a digital signal processor (DSP) 18. For a cordless phone handset battery the high and low charging currents are preferably about 700 ma and 70 ma respectively.

DSP 18 monitors digitized battery voltage and battery temperature parameter values $V_{BAT}$, $T_{BAT}$ supplied to it voltage measuring unit 20 and temperature measuring unit 22, respectively, and forms the command signals to switch 16 in dependence on these parameters and also based upon an elapsed time of rapid charging TIME which it monitors utilizing digital clock signals supplied by a clock 24. Temperature measuring unit 22 utilizes an electrical signal from or electrical connection with a temperature sensitive element 26, such as a thermistor, in thermal communication with battery 12 in order to generate the battery temperature parameter value $T_{BAT}$. Temperature sensitive element 26 need not be in direct physical contact with the battery 12, and may measure temperature at a location near but displaced from the battery which has a temperature that is well correlated therewith. For example, the temperature at the measured location should correctly measure the initial battery temperature, which equals the battery temperature, but a temperature rise at the location may lag behind the actual battery temperature by several minutes. This lag can be compensated for by choosing a maximum temperature $T_{MAX}$, which is less than would be chosen if the temperature sensing element 26 were in direct physical contact with the battery. Consequently, it should be appreciated that the sensing element 26 can be located in the base unit or charger receiving a battery powered cordless handset, if an appropriate thermal conductive or radiative path is provided between the battery and the sensing element such as via registered conducting elements or windows in the handset and base unit (not shown).

In forming the command signals, DSP 18 also utilizes data stored or programmed in a memory 28, such as an EEPROM, including a target voltage $V_{TARGET}$ vs. temperature lookup table in area 28a, maximum and minimum battery temperatures $T_{MAX}$, $T_{MIN}$ in area 28b and maximum charging time $TIME_{MAX}$. in area 28c. In the production or set up of a new cordless phone, to account for manufacturing variances between units the actual ambient temperature and battery voltage at a desired target charge state may be measured for each particular unit, and the lookup table generated, utilizing the measured data point and the aforementioned linear relationship between target voltage and ambient temperature, and programmed into memory area 28a. The values in memory areas 28b and 28c are constant and need not be adapted to account for manufacturing variances.

Figure 3:
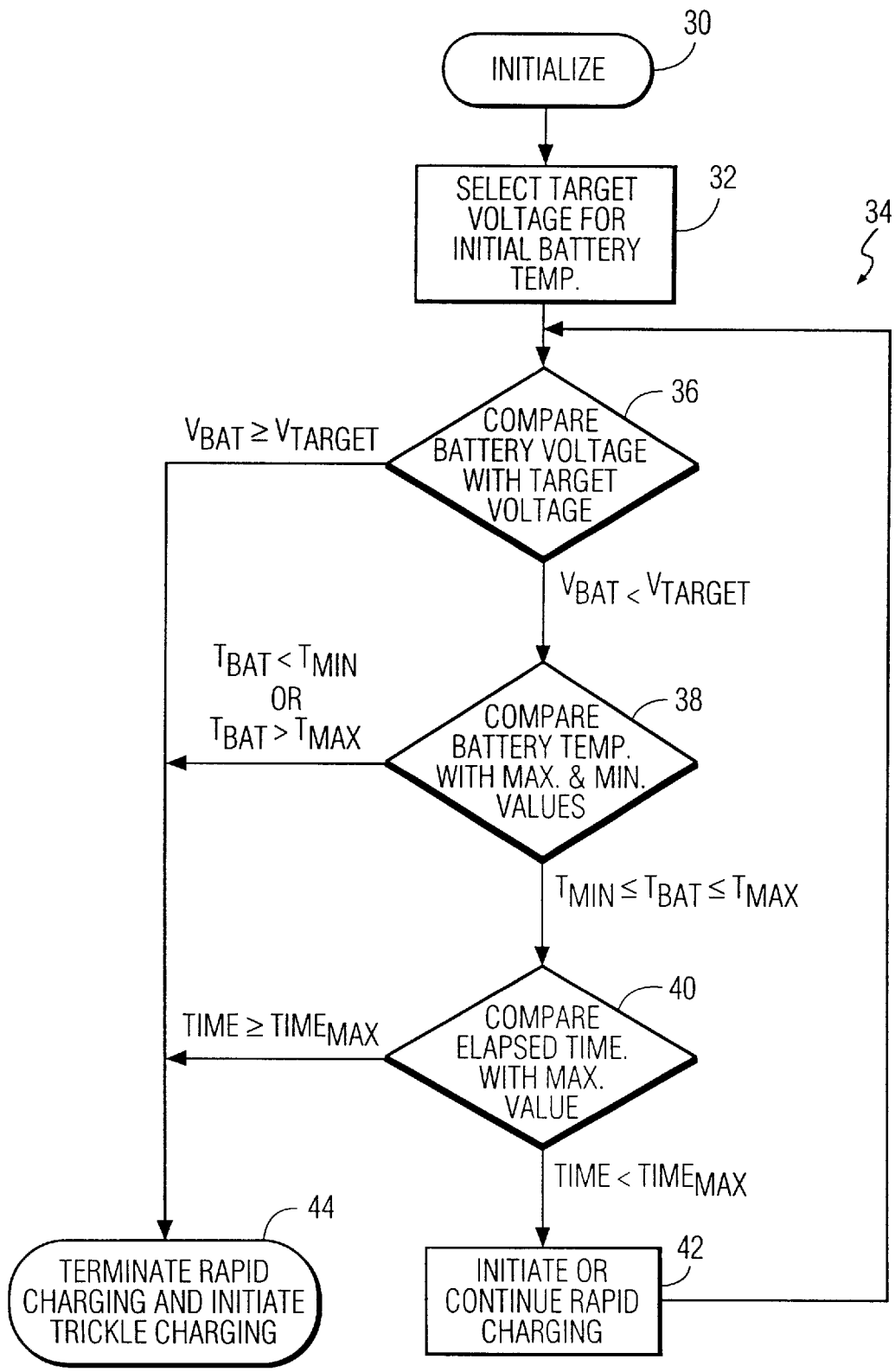
FIG. 3 is a flow chart indicating the battery charging control method employed in the battery charging system of the present invention.

Referring to FIG. 3, which is a flow chart of the program performed by DSP 18, it should become readily clear that after an initialization step 30, a target voltage $V_{TARGET}$ is determined in step 32 as a function of initially sensed battery temperature, which is assumed to equal the ambient temperature, by reference to the lookup table in memory area 28a. The target voltage corresponding to the sensed battery temperature is read from the lookup table using the sensed temperature as an index or address. Thereafter a program structure 34 is configured to terminate any rapid charging of the battery and switch to trickle charging upon any one of a plurality of conditions being satisfied, the conditions comprising:

a) $V_{BAT} \geq V_{TARGET}$;

b) $T_{BAT} < T_{MIN}$ OR $T_{BAT} > T_{MAX}$; and c) $TIME \geq TIME_{MAX}$.

Whether or not these conditions are satisfied is checked in three successive comparison steps 36 (where instantaneous battery voltage is compared with the target voltage determined in step 32), and 38 (where instantaneous battery temperature is compared with maximum and minimum values from memory area 28b), and step 40 (where elapsed time of rapid charging is compared with the maximum value in memory area 28c). If none of these successive conditions is satisfied, i.e. ($V_{BAT} < V_{TARGET}$) AND ($T_{MIN} < T_{BAT} < T_{MAX}$) AND (TIME<$TIME_{MAX}$), step 42 is reached in which the rapid charging state is initiated, whereas, if any of the conditions is satisfied, step 44 is reached in which any rapid charging state is terminated and a trickle charging state is initiated.

A loop is formed by steps 36, 38, 40, and 42, with step 42 also serving to continue an already initiated rapid charging state. The effect of this loop is that repeated execution of comparison steps 36, 38, and 40 occur once the rapid charging has been initiated, until any one of the conditions is satisfied at which time step 44 is reached. It should be understood that the order of comparison steps 36, 38, and 40, and whether a comparison result of equality is counted as satisfying or not satisfying a condition, are matters of design choice.

While the present invention has been described in particular detail, it should also be appreciated that numerous modifications are possible within the intended spirit and scope of the invention. For example, while the invention has been described in regard to charging a Nickel Cadmium (NiCad) battery, the battery charging technique is expected to be applicable to other battery types, such as may be applicable to other battery types such as Nickel Metal hydride (NiMh) and Lithium Ion.

What is claimed is:

1. A battery charging control device comprising:

means for determining a target voltage as a function of a sensed battery temperature or a sensed ambient temperature;

means for first comparing a sensed battery voltage with the determined target voltage and based on the result of the first comparing, detecting the occurrence of a first condition;

means for terminating the rapid charging in response to the detection of said first condition;

means for second comparing a sensed battery temperature with a predetermined maximum temperature and based on the result of the second comparing, detecting the occurrence of a second condition; wherein said terminating means is for terminating the rapid charging in response to the detection of occurrence of any of the first and said second conditions; and means for third comparing a sensed battery temperature with a predetermined minimum temperature and based on the result of the third comparing, detecting the occurrence of a third condition; wherein said terminating means is for terminating the rapid charging in response to the detection of occurrence of any of the first, second, and third conditions.

2. A battery charging control device comprising:

means for determining a target voltage as a function of a sensed battery temperature or a sensed ambient temperature;

means for first comparing a sensed battery voltage with the determined target voltage and based on the result of the first comparing, detecting the occurrence of a first condition;

means for terminating the rapid charging in response to the detection of said first condition; and means for second comparing an elapsed time of charging with a predetermined maximum time and based on the result of the second comparing, detecting the occurrence of a second condition; wherein said terminating means is for terminating the rapid charging in response to the detection of occurrence of any of the first and second conditions.

3. A battery charging control device comprising:

means for determining a target voltage as a function of a sensed battery temperature or a sensed ambient temperature;

means for first comparing a sensed battery voltage with the determined target voltage and based on the result of the first comparing, detecting the occurrence of a first condition;

means for terminating the rapid charging in response to the detection of said first condition;

means for second comparing a sensed battery temperature with a predetermined maximum temperature and based on the result of the second comparing, detecting the occurrence of a second condition; wherein said terminating means is for terminating the rapid charging in response to the detection of occurrence of any of the first and said second conditions; and means for third comparing an elapsed time of charging with a predetermined maximum time and based on the result of the third comparing, detecting the occurrence of a third condition; wherein said terminating means is for terminating the rapid charging in response to the detection of occurrence of any of the first, second, and third conditions.

4. A battery charging control method comprising:

first determining a target voltage as a function of a sensed battery temperature or a sensed ambient temperature;

first comparing a sensed battery voltage of a battery undergoing rapid charging with the determined target voltage;

second determining whether or not to terminate the rapid charging utilizing the result of said first comparing;

second comparing the sensed battery temperature with a predetermined maximum temperature, wherein said second determining also utilizes the result of said second comparing; and third comparing the sensed battery temperature with a predetermined maximum temperature; wherein said second determining also utilizes the result of said third comparing.

5. A battery charging control method comprising:

first determining a target voltage as a function of a sensed battery temperature or a sensed ambient temperature;

first comparing a sensed battery voltage of a battery undergoing rapid charging with the determined target voltage;

second determining whether or not to terminate the rapid charging utilizing the result of said first comparing; and second comparing an elapsed time of rapid charging with a predetermined maximum time, wherein said second determining also utilizes the result of said second comparing.

6. A battery charging control method comprising:

first determining a target voltage as a function of a sensed battery temperature or a sensed ambient temperature;

first comparing a sensed battery voltage of a battery undergoing rapid charging with the determined target voltage;

second determining whether or not to terminate the rapid charging utilizing the result of said first comparing;

second comparing the sensed battery temperature with a predetermined minimum temperature, wherein said second determining also utilizes the result of said second comparing; and third comparing an elapsed time of rapid charging with a predetermined maximum time, and wherein said second determining also uses the result of said third comparing.

7. A battery charging control method comprising:

first determining a target voltage as a function of a sensed battery temperature or a sensed ambient temperature;

first comparing a sensed battery voltage of a battery undergoing rapid charging with the determined target voltage;

second determining whether or not to terminate the rapid charging utilizing the result of said first comparing;

second comparing the sensed battery temperature with a predetermined temperature, wherein said second determining also utilizes the result of said second comparing; and third comparing an elapsed time of rapid charging with a predetermined maximum time, wherein said second determining also utilizes the result of said third comparing.

8. In a method for rapidly charging a battery, a control method comprising:

determining from both a sensed temperature and a sensed voltage when the battery has reached a target charge state;

terminating the rapid charging in response to the result of said determining; and wherein said determining when the battery has reached a target charge state includes reading a target voltage from a lookup table using the sensed temperature as an index, and comparing the sensed battery voltage with the target voltage.

9. In a method for rapidly charging a battery, a control method comprising:

determining from both a sensed temperature and a sensed voltage when the battery has reached a target charge state;

terminating the rapid charging in response to the result of said determining; and wherein said determining when the battery has reached a target charge state also takes into account whether an elapsed time of charging is less than a predetermined maximum time.

10. The method of claim 8 wherein:

said determining when the battery has reached a target charge state also takes into account whether an elapsed time of charging is less than a predetermined maximum time.

11. A battery charging control device comprising:

means for determining a target voltage as a function of a sensed battery temperature or a sensed ambient temperature;

means for first comparing a sensed battery voltage measured during a rapid charge of the battery with the determined target voltage and based on the result of the first comparing, detecting the occurrence of a first condition;

means for terminating the rapid charging in response to the detection of said first condition; and means for second comparing, a sensed battery temperature with a predetermined maximum temperature and based on the result of the second comparing, detecting the occurrence of a second condition; wherein said terminating means is for terminating the rapid charging in response to the detection of occurrence of any of the first and said second conditions.

12. A battery charging control device comprising:

means for determining a target voltage as a function of a sensed battery temperature or a sensed ambient temperature;

means for first comparing a sensed battery voltage measured during a rapid charge of the battery with the determined target voltage and based on the result of the first comparing, detecting the occurrence of a first condition;

means for terminating the rapid charging in response to the detection of said first condition; and means for second comparing a sensed battery temperature with a predetermined minimum temperature and based on the result of the second comparing, detecting the occurrence of a second condition; wherein said terminating means is for terminating the rapid charging in response to the detection of occurrence of any of the first and said second conditions.

13. A battery charging control method comprising:

first determining a target voltage as a function of a sensed battery temperature or a sensed ambient temperature;

first comparing a sensed battery voltage of a battery measured during a rapid charge of the battery with the determined target voltage;

second determining whether or not to terminate the rapid charging utilizing the result of said first comparing; and second comparing the sensed battery temperature with a predetermined maximum temperature, wherein said second determining also utilizes the result of said second comparing.

14. A battery charging control method comprising:

first determining a target voltage as a function of a sensed battery temperature or a sensed ambient temperature;

first comparing a sensed battery voltage of a battery measured during a rapid charge of the battery with the determined target voltage;

second determining whether or not to terminate the rapid charging utilizing the result of said first comparing; and second comparing the sensed battery temperature with a predetermined minimum temperature, wherein said second determining also utilizes the result of said second comparing.

15. A battery charging control device comprising:

a voltage measurement device adapted for measuring a sensed battery voltage measured during a rapid charge of the battery;

a temperature measurement element adapted for measuring a sensed battery temperature;

a processing unit adapted to determine a target voltage as a function of the sensed battery temperature, compare the sensed battery voltage with the determined target voltage, and detect the occurrence of a first condition based on the sensed battery voltage equaling or exceeding the determined target;

a switch control unit communicatively connected to the processing unit and adapted for controlling the rapid charge of the battery based on the detection of the occurrence of the first condition by the processing unit;

wherein the processing unit is further adapted to compare the sensed battery temperature with a predetermined maximum temperature and detect the occurrence of a second condition based on the sensed battery temperature equaling or exceeding the predetermined maximum temperature; and wherein the switch control unit is further adapted for controlling the rapid charge of the battery based on the detection of the occurrence of the second condition by the processing unit.

16. A battery charging control device comprising:

a voltage measurement device adapted for measuring a sensed battery voltage measured during a rapid charge of the battery;

a temperature measurement element adapted for measuring a sensed battery temperature;

a processing unit adapted to determine a target voltage as a function of the sensed battery temperature, compare the sensed battery voltage with the determined target voltage, and detect the occurrence of a first condition based on the sensed battery voltage equaling or exceeding the determined target;

a switch control unit communicatively connected to the processing unit and adapted for controlling the rapid charge of the battery based on the detection of the occurrence of the first condition by the processing unit;

wherein the processing unit is further adapted to compare the sensed battery temperature with a predetermined minimum temperature and detect the occurrence of a second condition based on the sensed battery temperature being less than the predetermined minimum temperature; and wherein the switch control unit is further adapted for controlling the rapid charge of the battery based on the detection of the occurrence of the second condition by the processing unit.

17. A battery charging control device comprising:

a voltage measurement device adapted for measuring a sensed battery voltage measured during a rapid charge of the battery;

a temperature measurement element adapted for measuring a sensed battery temperature;

a processing unit adapted to determine a target voltage as a function of the sensed battery temperature, compare the sensed battery voltage with the determined target voltage, and detect the occurrence of a first condition based on the sensed battery voltage equaling or exceeding the determined target;

a switch control unit communicatively connected to the processing unit and adapted for controlling the rapid charge of the battery based on the detection of the occurrence of the first condition by the processing unit;

wherein the processing unit is further adapted to compare an elapsed time of charging with a predetermined maximum time and detect the occurrence of a second condition based on the elapsed time of charging equaling or exceeding the predetermined maximum time; and wherein the switch control unit is further adapted for controlling the rapid charge of the battery based on the detection of the occurrence of the second condition by the processing unit.

18. A battery charging control device comprising:

means for determining a target voltage as a function of a sensed battery temperature or a sensed ambient temperature;

means for first comparing a sensed battery voltage with the determined target voltage and based on the result of the first comparing, detecting the occurrence of a first condition;

means for terminating the rapid charging in response to the detection of said first condition;

means for second comparing a sensed battery temperature with a predetermined minimum temperature and based on the result of the second comparing, detecting the occurrence of a second condition; wherein said terminating means is for terminating the rapid charging in response to the detection of occurrence of any of the first and said second conditions; and means for a third comparing an elapsed time of charging with a predetermined maximum time and based on the result of the third comparing, detecting the occurrence of a third condition; wherein said terminating means is for terminating the rapid charging in response to the detection of occurrence of any of the first, second, and third conditions.

* * * * *